United States Patent
Deming, Jr.

(10) Patent No.: US 7,207,293 B2
(45) Date of Patent: Apr. 24, 2007

(54) PROTECTIVE CAT SCRATCHING POST

(76) Inventor: Robert F. Deming, Jr., 654 9th Ave., Suite 1, New York, NY (US) 10036

( * ) Notice: Subject to any disclaimer, the term of this patent is extended or adjusted under 35 U.S.C. 154(b) by 0 days.

(21) Appl. No.: 10/864,688

(22) Filed: Jun. 9, 2004

(65) Prior Publication Data

US 2005/0039695 A1 Feb. 24, 2005

Related U.S. Application Data

(60) Provisional application No. 60/477,454, filed on Jun. 10, 2003.

(51) Int. Cl.
*A01K 15/02* (2006.01)
(52) U.S. Cl. .................................................. 119/706
(58) Field of Classification Search ............... 119/706, 119/702; D6/610, 612–613; 297/463.1; 248/345.1; 108/27
See application file for complete search history.

(56) References Cited

U.S. PATENT DOCUMENTS

| | | | |
|---|---|---|---|
| D180,959 S * | 9/1957 | Roberdeaux | .................. D6/610 |
| 3,581,707 A | 6/1971 | Cook | |
| D221,400 S | 8/1971 | O'Donnell | |
| 3,950,795 A * | 4/1976 | Dolnick | .......................... 4/559 |
| 4,177,763 A | 12/1979 | Cook | |
| 4,302,048 A | 11/1981 | Yount | |
| 4,926,796 A | 5/1990 | Leopold | |
| 4,996,946 A | 3/1991 | Olson | |
| D322,494 S | 12/1991 | Reynolds | |
| 5,114,270 A * | 5/1992 | Riddle | .......................... 405/15 |
| D336,033 S * | 6/1993 | Welsh | .......................... D8/403 |
| 5,311,825 A * | 5/1994 | Bonham | ....................... 108/27 |
| 5,452,666 A * | 9/1995 | Peters | .......................... 108/27 |
| 5,592,901 A * | 1/1997 | Birmingham | ............... 119/706 |
| 5,619,953 A | 4/1997 | Griffin | |
| 5,878,455 A * | 3/1999 | Patterson | ....................... 5/663 |
| 6,085,458 A * | 7/2000 | Gau | .............................. 47/33 |
| 6,089,188 A * | 7/2000 | Corley | ........................ 119/161 |
| 6,263,630 B1 * | 7/2001 | Bennett | ........................ 52/312 |
| 6,343,569 B1 * | 2/2002 | Buendiger | .................. 119/706 |
| 6,360,692 B2 * | 3/2002 | Gear | .............................. 119/706 |
| 6,367,423 B1 * | 4/2002 | Scheuer | ....................... 119/706 |
| 6,715,447 B2 * | 4/2004 | Haber | ........................ 119/702 |
| 6,834,462 B2 * | 12/2004 | Conde | .............................. 47/33 |

OTHER PUBLICATIONS

Cat Around Brochure by Robert Deming. A Safe & Healthy Alternative For Your Cat. They'll Love It, Guaranteed. Jul. 2003.

* cited by examiner

*Primary Examiner*—Son T. Nguyen
(74) *Attorney, Agent, or Firm*—Lucas & Mercanti, LLP

(57) ABSTRACT

The present invention is constructed to specifically protect furniture and building corners from the scratching of cats and to be free standing. The vertical members can be fastened rigidly or hinged. Joining the vertical members with hinges allows for increased versatility, in that, the invention can be used in multiple phases of the cat's development. The present invention, when hinged, has two key positions: 1). upright and angular—which serves to protect the corner of a piece of furniture and 2). upright and monolithic, with the vertical panels back-to-back—which serves as an independent cat scratching post that can be positioned away from furniture.

9 Claims, 10 Drawing Sheets

FIG. 6
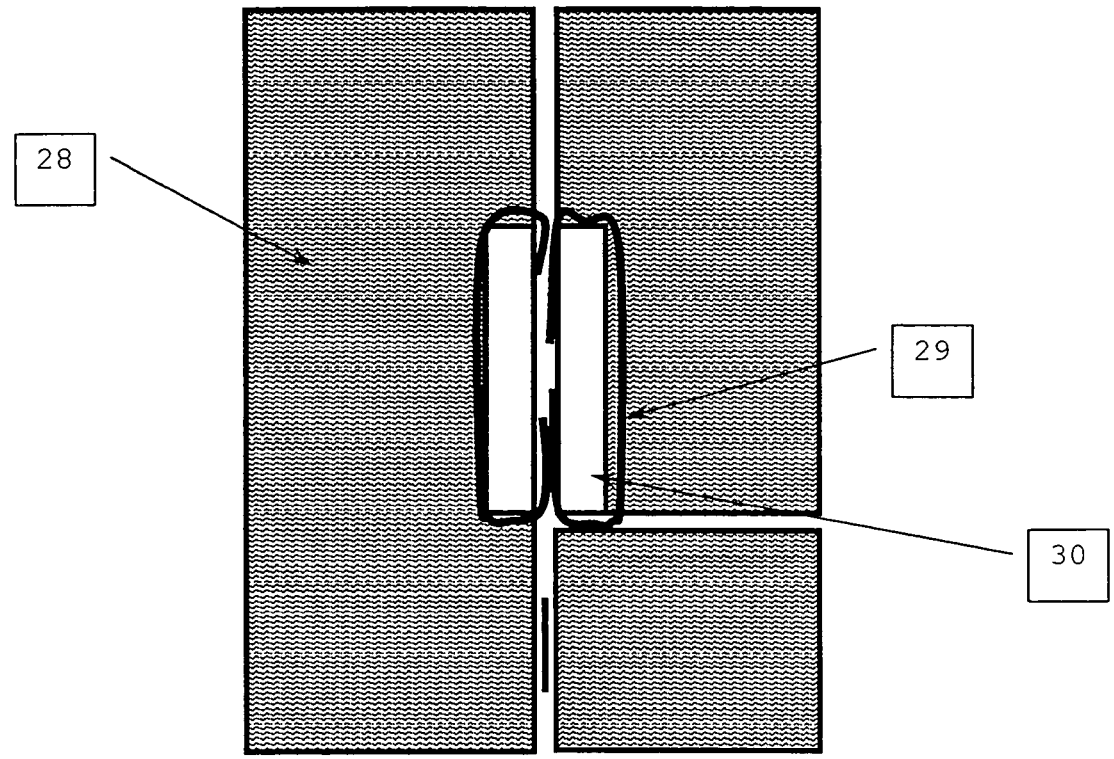
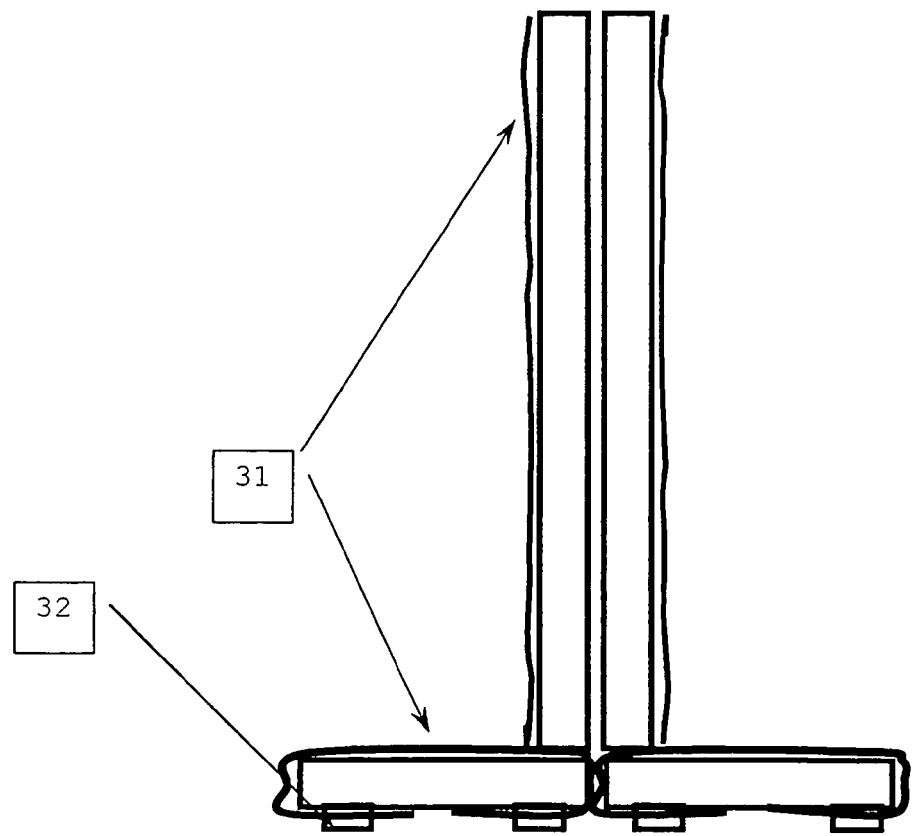

FIG. 8
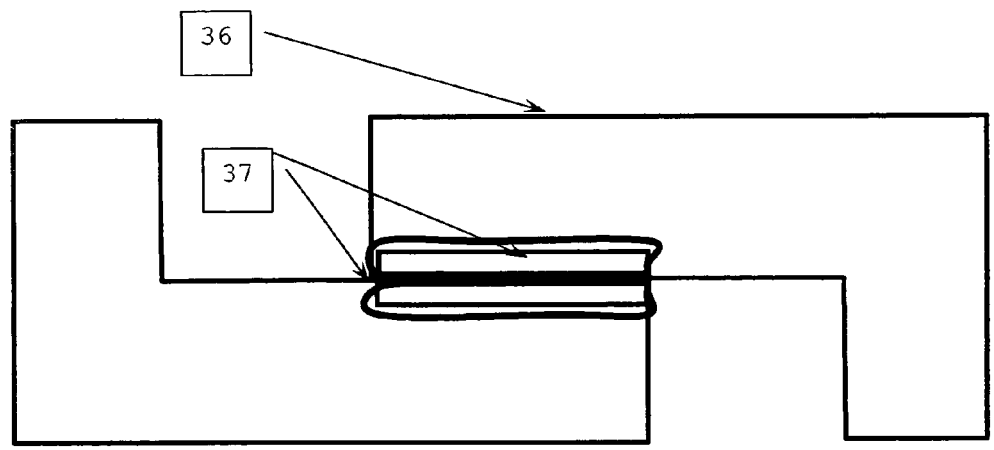
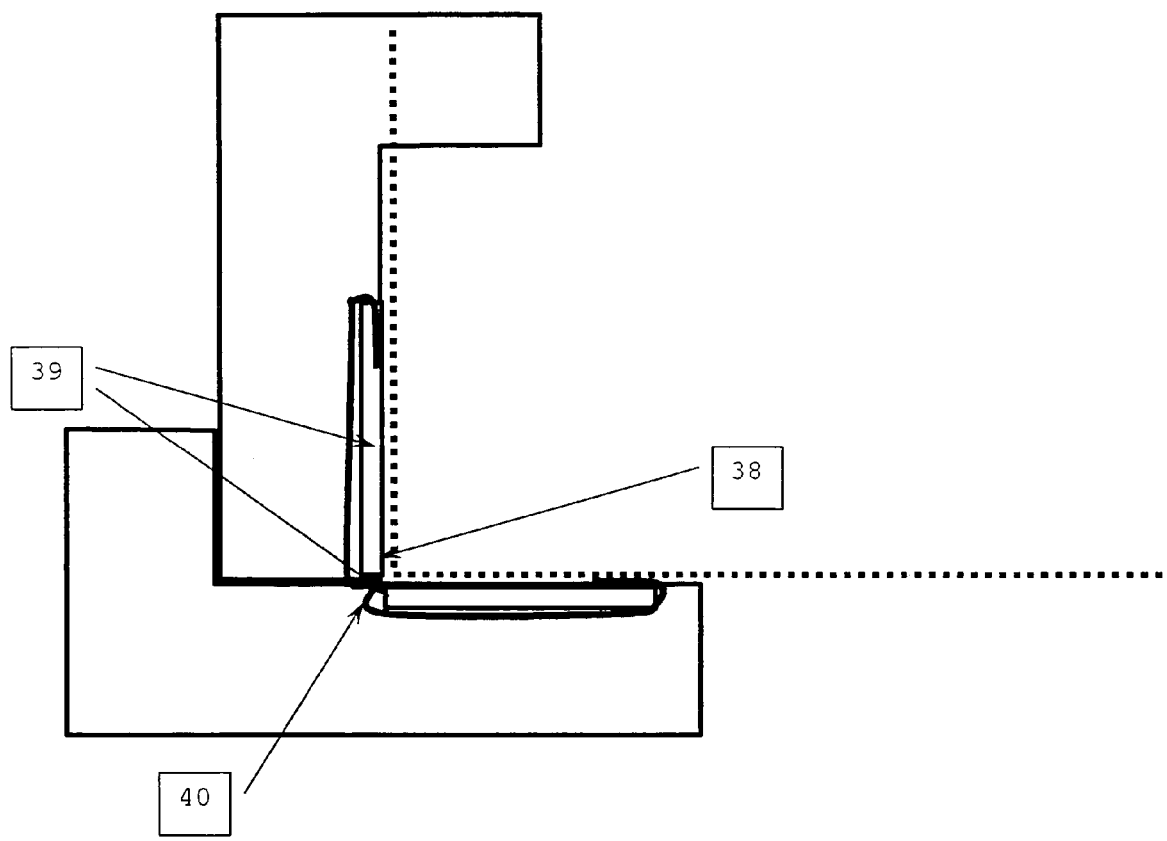

PROTECTIVE CAT SCRATCHING POST

CROSS REFERENCE TO RELATED APPLICATIONS

This Application claims the priority of U.S. Provisional Patent Application No. 60/477,454 filed Jun. 10, 2003, now abandoned.

BACKGROUND OF THE INVENTION

1. Field of the Invention

This invention relates to a structure for a cat scratching post which can be foldable or rigid and, when in use, wraps a corner of a piece of furniture or a wall corner. When positioned to protect a corner the base and vertical panels are each perpendicular to each other. The apparatus specifically protects said corner while remaining structurally independent of the corner. Then the hinged version of the present invention, can be reset—with base pieces parallel—and can be positioned away from the furniture once the cat has acclimated to the post.

2. Art Relating to the Invention

Cats are inclined to scratch furniture primarily at the corners. Experts on the subject, often suggest placing a cat scratching tree or post adjacent to the subject corner(s) of the furniture piece to attract the cat to scratch the post in lieu of the furniture corner. It is suggested that a cat owner train the cat by guiding the cat's paws over the post's vertical surfaces until the cat understand to choose the post over the furniture corner. It is then suggested that when the cat is choosing to use the post, the cat owner then slowly move the post to another desired position away from the furniture corner. This method requires an intense amount of monitoring a cat's whereabouts and mood.

The vast majority of the cat scratching posts, in use today, are rigid, solidly adjoined configurations which are built to remain in one shape. Generally the post's structural material, in the vertical direction, is covered with sisal or carpet or a suitable textile while the naturally covered bark covered tree branch sections are not. The posts generally stand with a base which is a single horizontal piece of material that is generally covered in carpet or sisal or suitable textile.

Single covered panels, with no base piece, or dual attached covered panels—in the vertical direction—with no base, are available. The panels are covered with a suitable material, often sisal, and are mostly meant to be hung on a door via an affixed material loop or, in the case of the dual attached covered panels, they are screwed or nailed to said wall corner.

A two sided adhesive tape is often suggested as a means to deter cats from scratching a furniture corner. The owner can adhere the tape to the subject corner and when the cat starts to scratch, the outer adhesive side of the tape sticks to the paws or gathers, thus frustrating the cat to the point of discouraging the cat from continuing to scratch.

Recently a post was designed to sit adjacent to the corner of furniture, see Griffin, U.S. Pat. No. 5,619,953 while using the weight of the furniture piece to stabilize the post by resetting the furniture leg(s) on the horizontal base portion of the post. This requires the user to lift the corner(s) of the furniture to set the post. These posts, used other than at and under all corners could leave the furniture slightly cocked or unbalanced.

By far though, most scratching post units are built as a rigid amalgamation of textile covered posts, plateaus and enclaves which might have attached fake rodents, springing bobbles, dangling feathers, fake birds, etc. These sometimes elaborate posts, towers and trees lack a direct structural means to specifically protect furniture from the scratching of cats.

SUMMARY OF THE INVENTION

The present invention comprises attached panels, constructed so that it can be used to block and protect the corner of a piece of furniture or household corner, from cat scratching, while remaining structurally free standing relative to the subject corner.

The preferred embodiment of the invention is hinged, and thus, foldable into two important positions for two primary functions. The foldable embodiment of the invention is preferred over the rigidly constructed version of the present invention. Hinges are preferred as the method to adjoin the vertical panels; however, a durable pliable material could be employed to serve as a hinge between the panels.

The present invention includes two adjoined panels, covered in a textile suitable for cat scratching material, which are fastened together in the vertical, long direction. If the preferred use is to protect the furniture only, the vertical panels can be joined together with nails, screws and L-brackets and/or adhesive or any it is suitable method.

When a versatile version of the present invention is sought, then a hinge or foldable connection between the vertical panels is made with either a pliable durable material, metal hinges or suitable hardware. The two vertical members are each hinged to base panels, which may or may not be covered.

While a myriad of adjoined panel and base configurations are possible using various attachment techniques, the primary function of the present invention remains the same—and that is to wrap and protect the corner of a piece of furniture.

The apparatus is comprised of two attached vertical members, which are each then hinged to two base panels. The base panels are of two different lengths so that they may rotate on a vertical axis to form the multi-position base of the post which opens up to approximately 90°±. When open, the apparatus is in the corner protective position. When the vertical members are closed and folded back-to-back it creates a singular column that serves as a vertical independent scratching post. In this closed position, the base pieces sit abutting each other and parallel.

A hook and eyelet, or hasp, can be used to help hold folded pieces together, although it is not required. The hook and eyelet can be positioned on the joined vertical panels so that they do not come apart while in the vertical stand alone position. The overall stability of the apparatus is derived from making use of the inherent angles and base panels' counter weight—especially with the cat's weight added to the base. However, to hold the apparatus in place rubber material or pads can be affixed to the underside of the base.

A piece of flexible material, such as cloth, serves as a tether at the base of the apparatus. When the apparatus is open, the tether can be placed under the leg of the furniture piece to hold the present invention adjacent to the corner of said furniture. While the tether of the present invention has the function of holding the apparatus in place, it is not meant to hold the said apparatus upright.

Another configuration of the present invention is for two of the open apparatuses, with appropriately shaped integrated bases to be placed, adjacent to each other to form a central box shaped post. Two panels in the open angled position, with a suitable conforming base configuration, can be placed back-to-back to create a single unit with a rectangular, four-sided center column.

BRIEF DESCRIPTION OF THE DRAWINGS

These and other aspects of the present invention may be more fully understood with reference to the drawings wherein:

FIG. 6 shows the panels of the invention wrapped in a suitable textile such as sisal.

FIG. 8 shows an alternative base design allowing for greater stability with other configurations of the present invention.

DETAILED DESCRIPTION OF THE INVENTION

Figure 1:
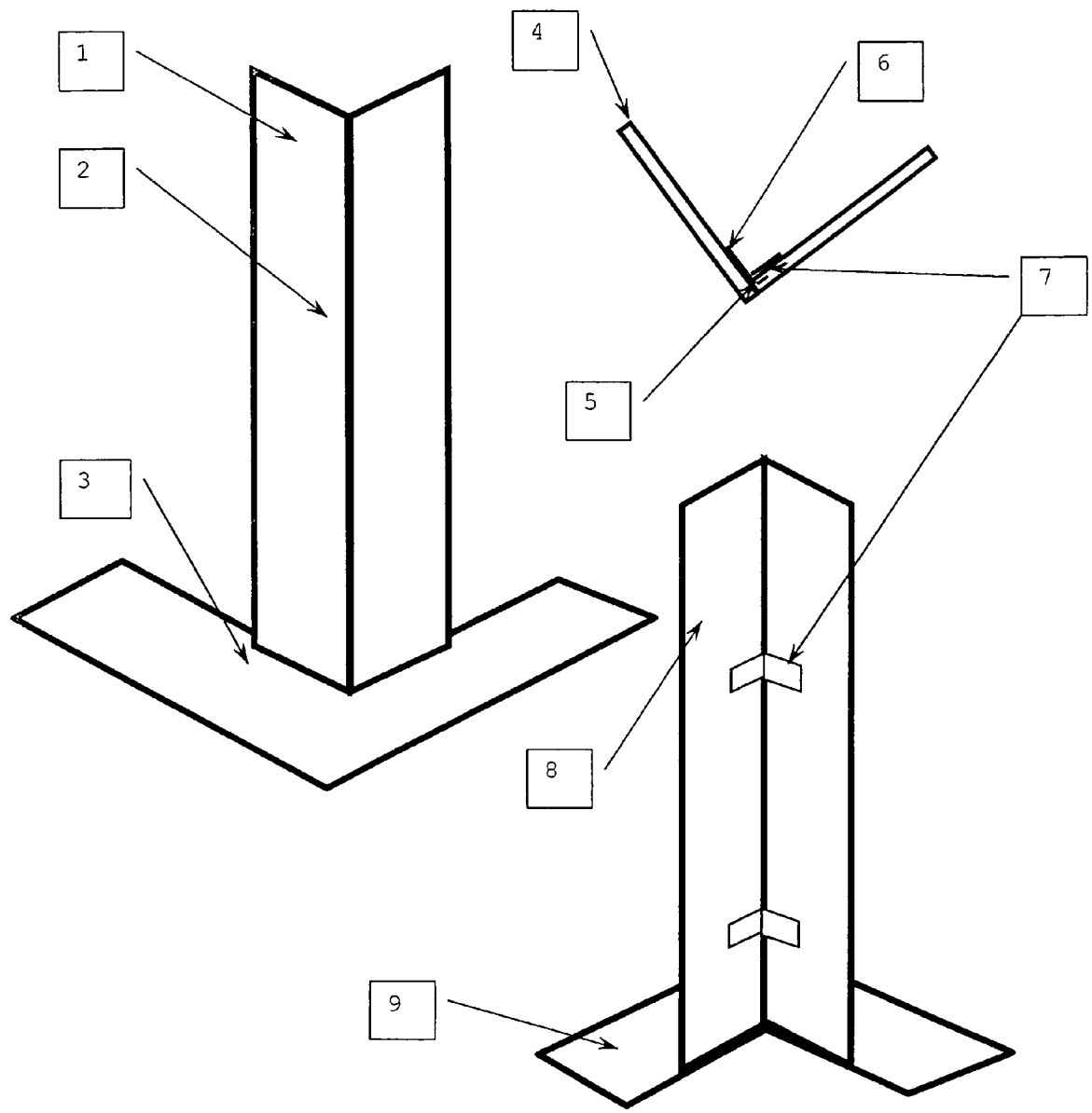
FIG. 1 shows the invention with a rigid construction.

The present invention is a cat scratching apparatus constructed to offer direct protection of furniture and building corners while standing independently. While a rigid version will indeed protect furniture corners, it will be limited to a single purpose and a new post would have to be introduced to the cat if its owner decided to definitively move scratching activity away from the subject corner. Thus, the present invention is constructed for two phases of use: 1). protecting and adjacent to a corner, and 2). folded back-to-back, monolithic in appearance, and positioned away from a corner. The protection offered from the apparatus is the same for the corner of the furniture whether said apparatus is constructed to be rigid or foldable.

If a rigid configuration is desired the vertical panels are fastened along their common corner. The fasteners used in the rigid method include, adhesives, nails, screws and L-brackets, etc. as suitable means of attachment.

The preferred embodiment of the present invention is the hinged multi-position configuration. In the foldable multi-phase, multi-use version of the present invention, the vertical members of apparatus are hinged along their common corner. This foldable version offers multiple uses—offering to directly protect furniture corners and establish the cat's acclimation; and once the cat is habitually using the apparatus at the corner position, the apparatus can be moved away from the subject corner. During the progression, the vertical panels can be gradually closed together and the apparatus can positioned in a location suitable to the household. The present invention is to be used in direct conjunction with known and understood needs of those people using cat scratching posts and who desire to protect their furniture from cat scratching. Obviously, the different angles available from the preferred embodiment of the present invention lend use to covering and protecting other sized angles of building and furniture corners.

Because the invention is to be used to protect furniture corners, the height should be suitable to protect furniture at their typical corner heights. This height range combined with what is understood to be suitable height—16" to 36"—for typical cat scratching and stretching, offers a preferred height range for the current invention. Sofas and chairs are often the target of scratching. Two dimensions of the current invention to protect the front corner under the armrest of a sofa or chair is 24" in height and 26" in height. The lower corners of chairs or sofas at the front where there is a step from the armrest, to the seat cushion, to the floor would best be protected with the 18" version of the invention. The corners of a typical bed and mattress can best be protected with the 18" version of the invention.

Taller corners such as the back of a bed headboard, the back corner of a chair or sofa or the corner of a doorjamb can best be protected by taller versions of the current invention ranging in height from 30" to 36". In each case of the examples here-to-fore described the height of the furniture, combined with the aesthetic taste of the persons employing the employing the present invention, combined with the observed scratching habits of the cat, will offer the best means to choose the correct height for the corner protective scratching post.

Because there is a preferred aesthetic and neat relationship between the two base panels in that the two panels have two end point relationship—parallel and cornered perpendicular, it is preferred that at these two points, relatively straight lines are created between the members. However, because construction materials vary the exact construction relationships vary from version to version.

An overall guide to constructing the base is used to arrive at workable dimensions for the base. The structural base has five key structural areas. The shorter section of the base has two—the area directly perpendicular to the adjoining column and the lateral sub-area from the adjoined column which is the remainder of the base needed for stabilization. The longer section of the of the two part base has the same area directly perpendicular at the base of the adjoined column and two lateral sub-areas for stabilization on either side of the perpendicular area.

The following relationships are preferred, in order to meet a desired aesthetically neat and proportionate construction of the present invention. The lateral areas' or sub-areas', length and width, should create a rectangle where the dimension of the width (perpendicular to the long dimension of the column footing) is equal to the width of said area less the thickness of the column footprint. The outside final dimension of each lateral area should be equal to the other lateral base area of the shorter and longer base areas. This will allow for the lateral areas and indeed the base pieces to line up, when pivoted to the parallel or perpendicular position.

The two areas for the shorter and longer sides of the base, perpendicular and directly adjoining the columns, are equal to each other. The dimensions of said area are best measured as follows. The parallel dimension of the area just underneath the adjoined vertical column, for either short or long component of the base should be approximately equal to the width of said column; and the dimension perpendicular to the long dimension of the column footprint or width of said area is obviously equal to the width of the sub-area or lateral areas of the base components. The exposed with of this area is approximately equal to width of the area the less the outside thickness of the vertical column.

The two columns' dimensions are equal to each others in terms of their length, width and height.

It should be noted that the present invention will stand in a stable manner at any point in the radius from the parallel to perpendicular positions.

While the present invention is not limited to the construction methods described herein, the scratching post has been built using the two following processes.

One example of the construction of the protective corner scratching post utilizes the following materials: Plywood, latex backed sisal, metal corner braces, metal hinges, non-toxic latex glue, hot gun glue sticks, heavy duty u-shaped staples and gun, screws and drill. The desired outside dimensions of the invention and the physical properties of the materials and components are taken into account in order to achieve one version of the present invention, along with the maximum yield of material such as that from a sheet of plywood.

The first version can be summarized as "25½" high, hinged with sisal scratch areas on all vertical and horizontal surfaces". Cut four pieces of ⅝" plywood as follows: two @ 23¹⁵⁄₁₆"×6¾"—for the columns, one @ 13½"×6¾"—for the short base piece and one @ 21"×6¾" for the long base piece.

Sisal should be cut so that the cord is parallel to the long dimension of each of the pieces of sisal. Cut the sisal to wrap the columns sisal that front and back and top of the columns are covered. The two pieces will have an basic dimension of 24"×15¾" but with a 6¾" wide 1" flap of extra material extending and continuous beyond one of the 15¾" sides of the panel. Cut one piece of sisal with a 13½"×15¾" basic dimension but with a 6¾" flap on each of the 15¾" sides. Cut one piece of sisal with a 13½"×21" basic dimension and with a 6¾" flap for each of the 15¾" sides. The flaps are each to be continuous from the sisal panels.

Next set the two base pieces parallel to each other, with the long dimensions touching, having one end create a continuous line. Place two 3" metal corner braces on each panel, four total, adjacent to the "void" area of the base which is created by virtue of the shorter piece of the relative to the longer piece of the base. The brackets are to be upright from the base with the inside upward part of the bracket's plane parallel to the plane of the long edge of each base piece. All four brackets should be positioned well within 6" from the void area and on the mutual touching side of the base pieces. Stagger the brackets and screw them to the base so that the brackets from either side of the base do not meet.

To cover the base pieces with sisal, set the sisal piece upside up; place the corresponding base piece of plywood centered on top of the sisal, with flaps equal on all sides and with attached brackets upward. For each base piece, cut to slits in the sisal under the location of the two corner brackets. Move the sisal; cover the upper surface of the base piece with non-toxic latex glue. Place the sisal panel on top—passing the two brackets through the slits. Leave to dry for at least 24 hours or suitable drying time.

To glue the columns, place sisal panels upside down; cover one side of the plywood with non-toxic latex glue; place the glued side on the sisal such that one 6¾" end of the plywood is parallel to the non-flap 15¾" edge of the sisal panel, and on the opposite end the 6¾" plywood edge is centered on the 6¾" sisal flap. Press and set aside to dry for at least 24 hours or suitable drying time.

After the latex glue is dry, finish the base pieces. Wrap the panels tightly with the remainder of the sisal panels; use heavy duty u-shaped staples on the underside of the base pieces. Fold down the 6¾" flaps using the hot glue to adhere them to the plywood and sisal edges. Cut away overlaps and excess material on the edges and underside.

To attach the columns, first partially close the upper flap end of the columns using u-shaped staples and hot glue—leaving the bottom portion of the column open. Place one column piece centered on the long base piece such that the corner bracket touches the open plywood surface. Attach the column to the base, screwing the two corner braces to the column. Close off the open area of the column using heavy-duty u-shaped staples and non-toxic hot glue.

To attach the column to the short base piece, set the base pieces together so that a line is created between the ends of the two pieces—opposite the void side of the base—similar to the initial layout of the base. Set the column for the short base piece in line with the column of the long base piece so that the column units mirror each other and are the same distance from the sub-areas opposite the void side of the base. Move the attached long side away and screw the column to the base in the determined position. Close off the open area of the column using heavy-duty u-shaped staples and non-toxic hot glue.

Set the two piece perpendicular to each other such that the columns meet in a vertical line and a line is created with the outer long edge of the short base piece and the width end on the void side of the long base piece. Hinge the columns in two locations—one toward the top and one toward the bottom of the vertical common inside corner.

It has been found to be advantageous to place the hinges on top of the sisal material so that there is less chance for a serious bind or spring between the two columns which would cause the hinged post to be partially open. It has also been found that there should be about a ⅜" overhang of the column on the short side of the base so that there is a neater close and swing to the hinged version of the present invention. The dimensions of the material take this into account.

This version of the present invention weighs about 15 pounds. It stands about 25½" tall with the base when closed measuring approximately 22"×15".

The second example version of the present invention can be summarized as "18 to 24" high, with no metal hinges and sisal scratch areas on all vertical and horizontal surfaces". For this example the 24" version is described. Cut two pieces of ¾" plywood as follows for the base one @ 10¼"×5⅝" for the short base piece and one @ 15⅝"×5⅝" for the long base piece. Cut the two column pieces from 1"×4" wood material such as pine to lengths of 23" each.

Sisal should be cut so that the cord is parallel to the long dimension of each of the pieces of sisal. Cut the sisal to wrap the columns sisal that front and back and top of the columns are covered. The two pieces will have an basic dimension of 23"×8½" but with a 3½" wide 1" flap of extra material extending and continuous beyond one of the 8½" sides of the panel. Cut one piece of sisal with a 10¼"×12¾" basic dimension but with a one inch 3½" flap on each of the 12¾" sides. Cut one piece of sisal with a 12¾"×15⅝" basic dimension and with a one inch 3½" flap for each of the 12¾" sides. The flaps are each to be continuous from the sisal panels.

To cover the base pieces with sisal, set the sisal piece upside up; place the corresponding base piece of plywood centered on top of the sisal, with flaps equal on all sides cover one surface of each base plywood piece with non-toxic latex glue. Place the plywood panels centered on the corresponding sisal pieces. Leave to dry for at least 24 hours or suitable drying time.

The sisal to cover the columns is one continuous piece and should be first laid out on a paper pattern and then cut approximately as follows, depending on exact type of sisal or alternative suitable covering material such as carpet. The basic dimension for the column sisal is 23"×19" with two one inch flaps which are 3½" wide on one of the 19" sides, perpendicular to the cord direction, of the sisal. Locate the flaps such that they are each starting 4½" from the right and left of the outer edge of the sisal panel. Spread non-toxic latex glue on one face each of the two 1"×4"s. Set in place on the outer edge of the sisal panel, making sure that the wood is lined up with the sisal material itself, the outer edge of the sisal and the bottom edge is parallel to the straight cut sisal edges. Press and set aside to dry for at least 24 hours or suitable drying time.

After the latex glue is dry, finish the base pieces. Wrap the panels tightly with the remainder of the sisal panels; use heavy duty u-shaped staples on the underside of the base pieces. Fold down the flaps using the hot glue to adhere them to the plywood and sisal edges. Cut away overlaps and excess material on the edges and underside.

To continue with the columns, spread glue on the exposed surface of the wood. Fold each piece inward toward the center so that the newly glued surface is facing down and adhering to the sisal. Press the two columns away from each other and set a suitable weight on both sides of the column unit. Set aside for at least 24 hours or prescribed drying time.

After suitable drying time, glue each of the long edges of the columns to the adjacent inside sisal surface using hot glue. From the outside staple and screw the sisal to the newly adhered edges of the column pieces. Line up the cut openings of the base pieces with open bases of the columns. Make sure the inner edge of the column lines up with the inner edge of the corresponding base. Screw the base to the column from the underside of the base through the base to the foot of the column. Three 2" drywall screws can be used for each column. A metal corner brace can be used to affix the column to the base pieces and should be places during the construction process such that it is concealed.

The inner exposed sisal material and possibly the edge of the wood material, where the two columns make a corner, can be concealed with a suitable piece of cut cloth material adhered with a small line of hot glue.

This version of the present invention weighs about 12 pounds. It stands about 24" tall with the base when closed measuring approximately 16"×12".

With minor adjustments, bare surfaces, painted or finishes surfaces, carpeted surfaces, and/or synthetic surfaces may be substituted for the sisal covered surfaces in each of the examples described above. Indeed surfaces may comprise a combination of finishes such as sisal and carpet or synthetic material, suitable textile or wood such as cedar, with no covering. Molded or shaped plastic or any rigid suitable material may be used in constructing the present invention as long as it meets the desired requirements of directly shielding and protecting corners, stability scratch-able by a cat and free-standing when away from the corner.

The descriptions of the construction techniques, dimensions of the components and the materials of the present invention are not limited to that which is described heretofore. Reasonable and suitable base dimensions and weights should correspond with the height dimension such that there is a stable functionality. Indeed the base may be rounded or circular in its overall shape; but in any case the base should provide a stable support to the column component.

If a panel is used to fill the void at the base it can be covered in material similar to that of the rest of the base. So that the panel can be attached then removed, hook and eyelets can be used or Velcro® between the panel and either of the base pieces. If it is desired to permanently affix the panel, a hinge can be used and best be placed between the panel and the large base piece such that the panel fold on top of the large panel what the present invention is in the open position.

With an appropriate locking hinge affixing each of the columns to their corresponding base pieces the present invention can be constructed such that the base panels can be folded flat or relatively parallel to the columns so that the apparatus can be stored or offer a different scratching environment for the cat.

Referring now to FIG. 1., there are views of the invention as a rigid apparatus 1. The vertical panels 2 are fastened to each other and to the rigid base 3 with unbending fasteners. The panels 4 can be fastened with adhesive or nails 5 or screws 6 and can be integrated with L-brackets 7 which hold the panels 8 in the open position. Similarly the base 9 is shaped at a right angle of approximately 90° to fit around a corner.

Figure 2:
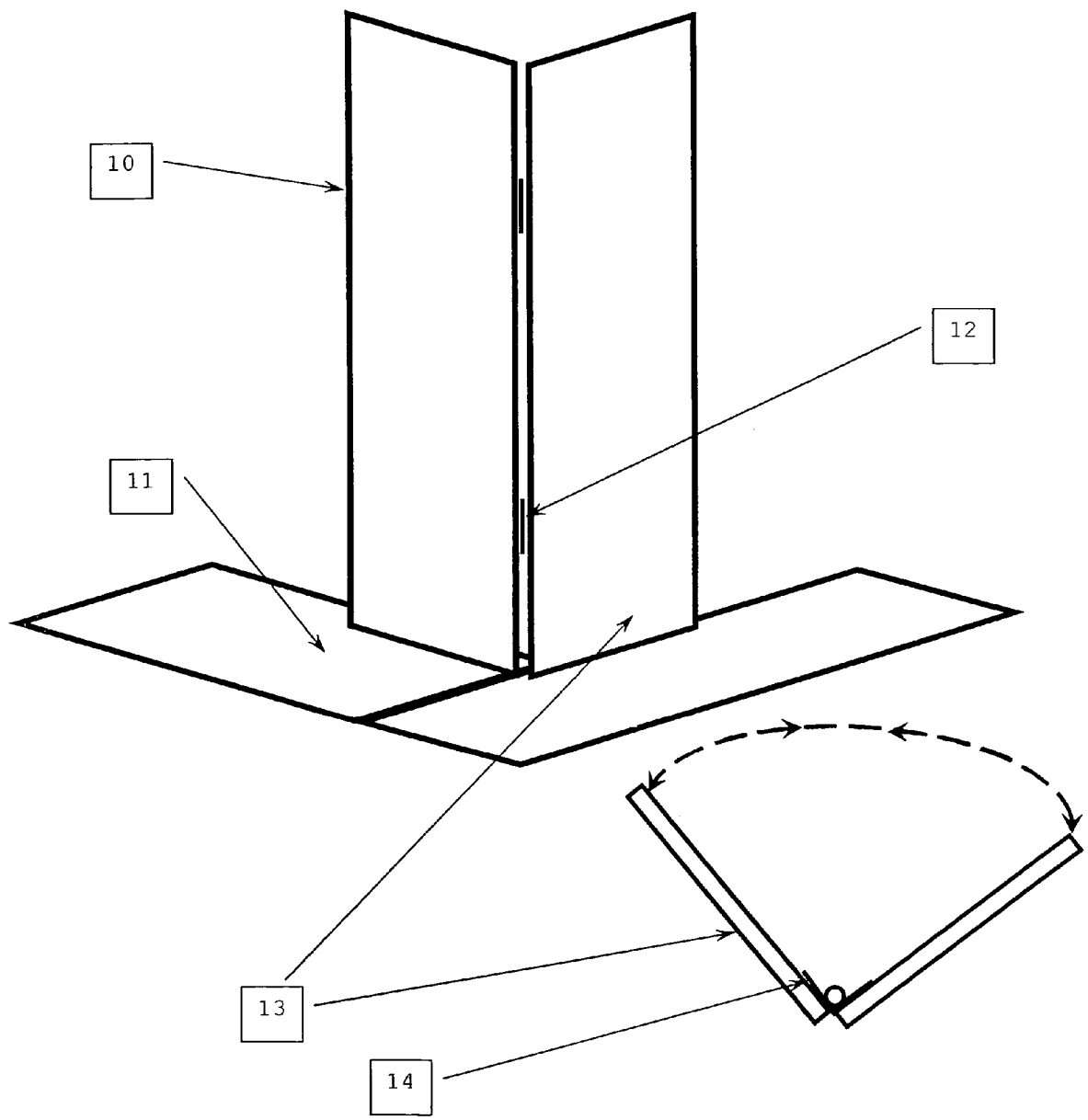
FIG. 2 shows the preferred embodiment of the invention in the open angular position and situated away from the piece of furniture.

FIG. 2 shows the invention in the open position 10 and standing on the base panels 11 independently away from any corner. While the angular open position serves the purpose of protecting a corner from cat scratching, it's functionality is greatly enhanced with hinges 12 on the vertical panels which allow the present invention to transition away from the corner to become a stand-alone unit. As the cat becomes acclimated to scratching the foldable post, the post vertical panels 13 can be closed with the hinges 14 that join them.

If the cat reverts back to scratching the furniture item, the present invention can conveniently be repositioned against the corner of the furniture.

Placing the present invention at the corner of furniture, while possessing the ability to easily convert the apparatus to and independent post, allows for the cat(s)' to establish the habit of scratching the post. Then the cat owner ultimately has the option to move the post away from the corner. At that point the post can placed in a long term location for the life (lives) of the cat.

Figure 3:
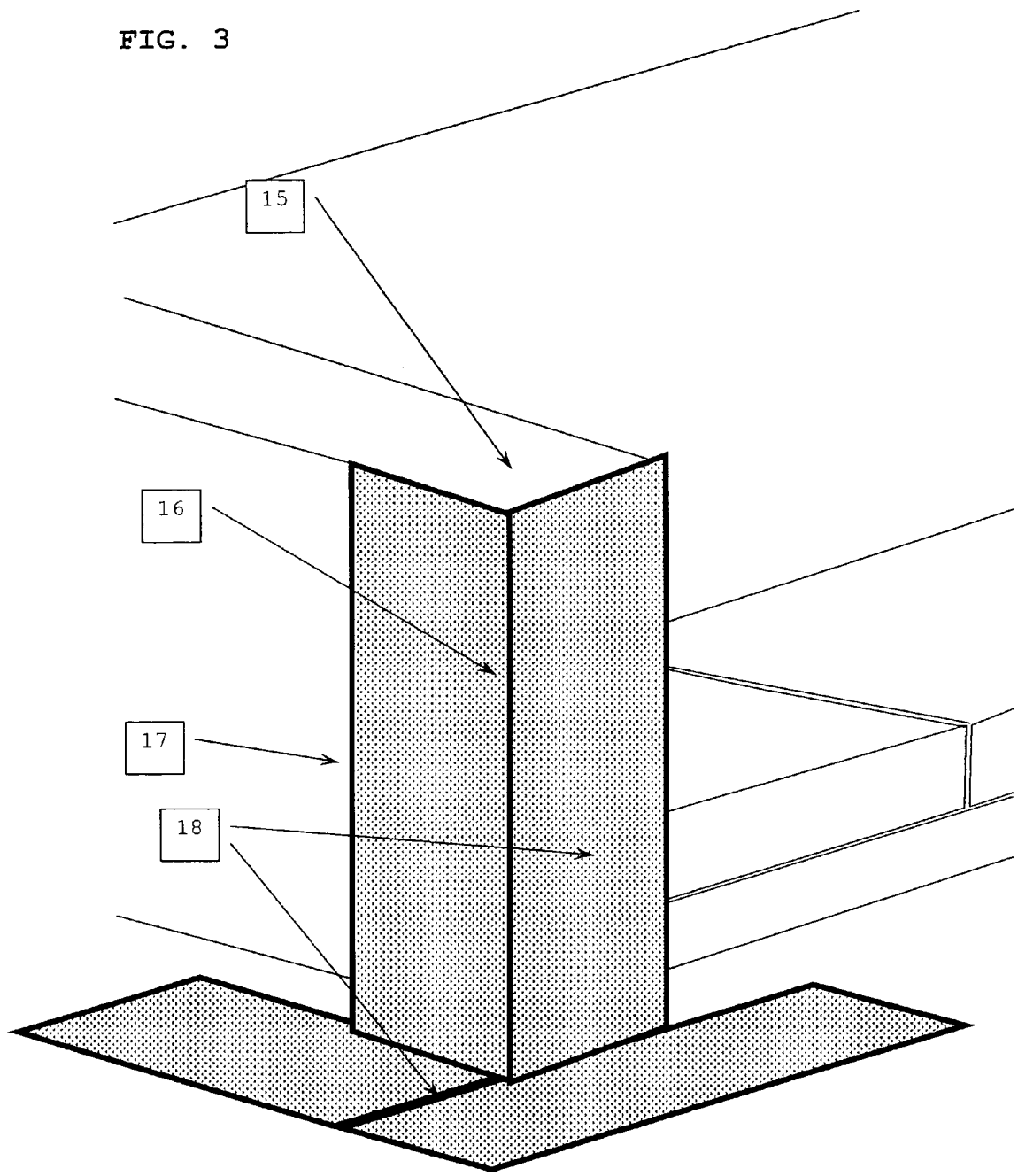
FIG. 3 shows the invention positioned next to a piece of furniture.

FIG. 3. shows the invention placed snug against the corner 15 of a sofa, which represents any piece of furniture such as a chair, bed, cabinet or wall or any household or any similar building interior corner. The present invention is adjusted to the open position 16 to wrap the subject corner which is often the apparent desirable place for a cat to scratch. Without the need to lift or move the furniture item or depend on the mass of the furniture—this apparatus can be positioned to block access to the furniture corner by wrapping the corner with the vertical panels 17. A suitable wrapping textile 18 covering each exposed surface is shown.

Figure 4:
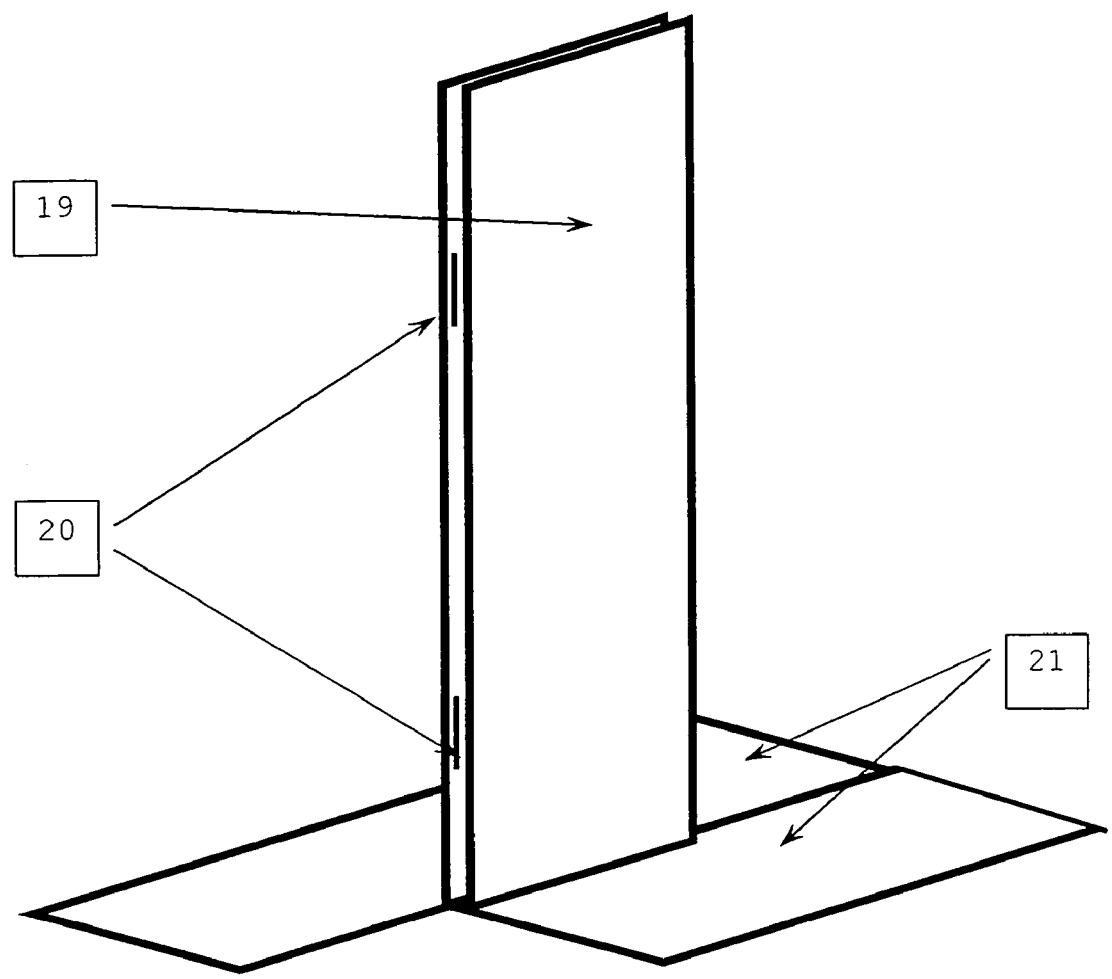
FIG. 4 shows preferred embodiment of the invention folded in the back-to-back monolithic position with possible extensions.

FIG. 4 shows the invention in the back-to-back monolithic stance with the vertical panels closed flat to each other. This arrangement comprises the two vertical members 19, being hinged 20 together. The attached base pieces 21 are positioned to be the feet of the center vertical members. The base pieces are brought together parallel.

Figure 5:
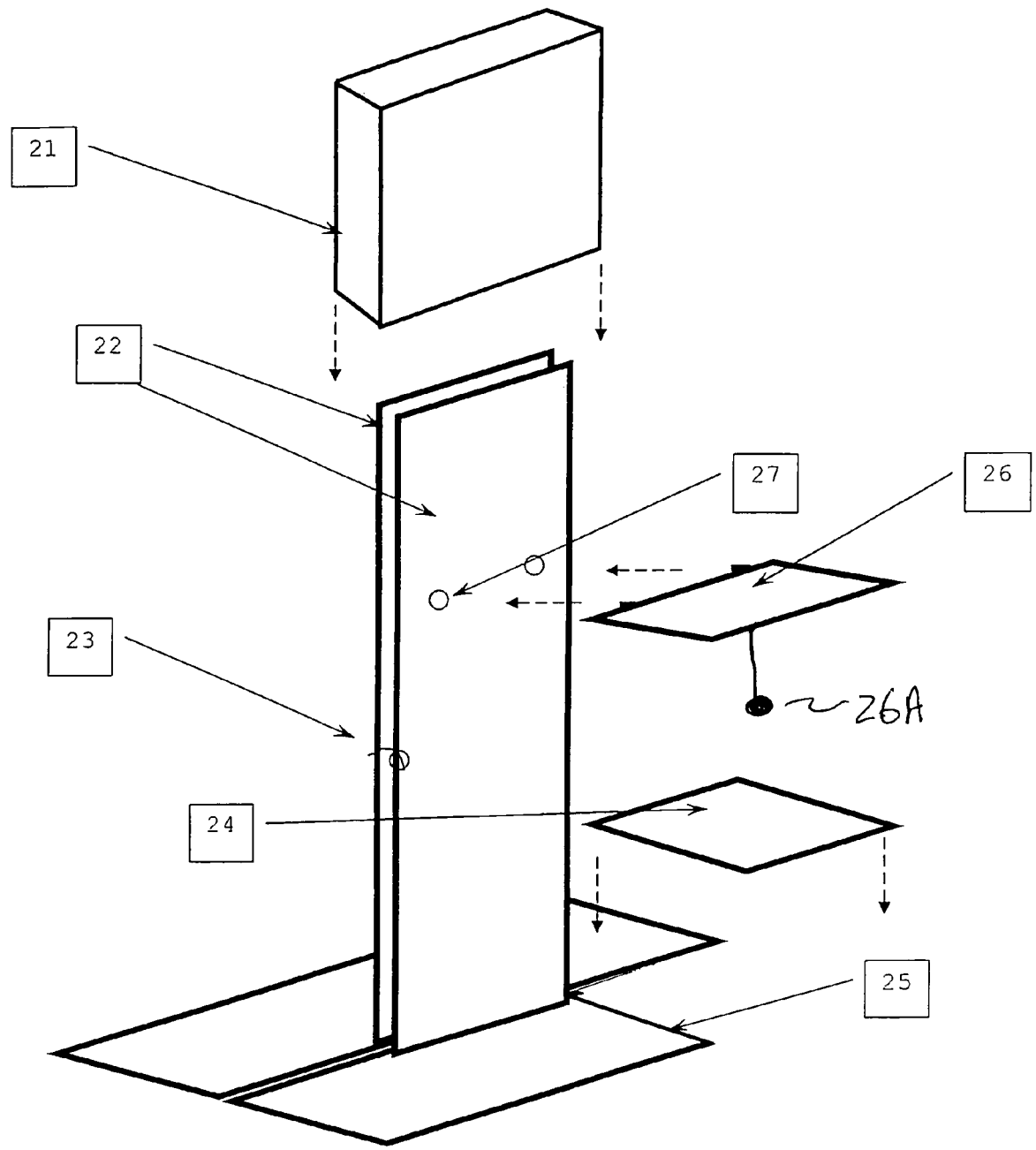
FIG. 5 shows the invention with various possible components.

FIG. 5 illustrates various attachments which can be added to enhance the versatility and appearance of the present invention. A cap 21 can be added to add height to the apparatus. It is most likely a suitable addition when the apparatus is in the back-to-back monolithic position 22. A hook-and-eyelet 23 or hasp can be employed to assure that the vertical panels stay together. An corner extension piece 24, for the shorter of the base pieces 25, can be added to complete the rectangle shape of the base when the structure is in the columnar independent position. Horizontal platforms 26 or fixtures, of various shapes, such as a bobble 26A, can be added to the basic open structure to create additional interest for the cat. The add-on pieces can be hinged or doweled 27.

FIG. 6 shows two views of the invention in the monolithic back-to-back position. The first illustration shows suitable textile 28 covering the base; the same or similar material 29 wrapping the vertical members 30. The second view of this illustration shows a slice through side of the structure with a suitable textile material 31 such as a sisal or carpet wrapping the structure's components. The second illustration shows base pads 32 which can be rubber or a suitable material to help hold the apparatus in place.

Figure 7:
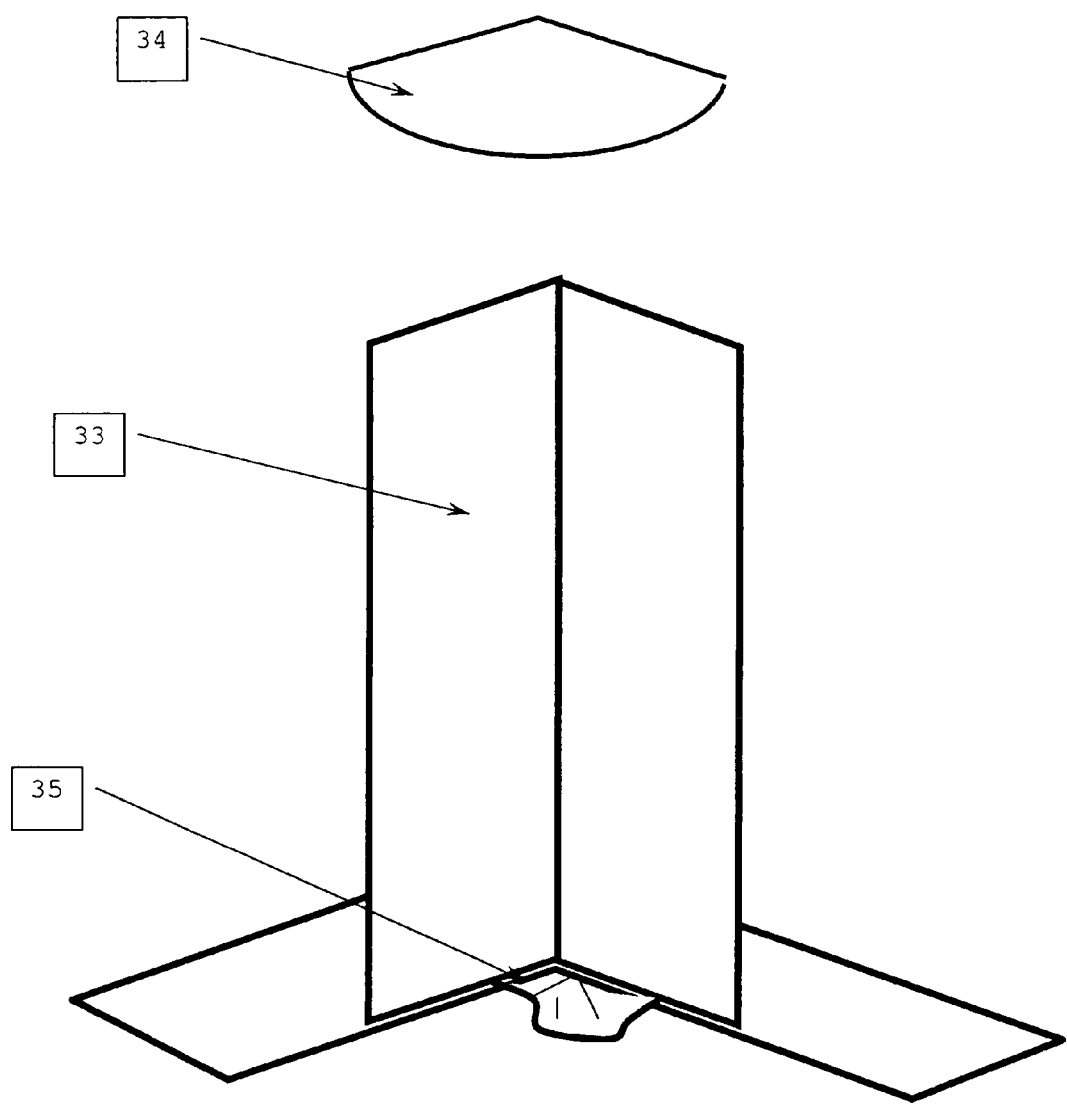
FIG. 7 shows the invention in the open invention with a tether and platform.

FIG. 7 Shows the present invention with the vertical panels opened 33. A panel 34 can be attached to created a top to the apparatus. The panel can have a length and width great than that of the perimeter of the columns. The top panel has trim on its underside at the perimeter around the columns to form a sleeve that wraps the columns. A flexible webbing material 35 is added near the base so that the present invention can be anchored adjacent to the furniture corner. It can be sewn, stapled or hot glued to the inner base of the present invention. This webbing, if used, is to help hold the apparatus close to the corner by means of placing the flexible webbing under the leg of the subject corner of furniture.

FIG. 8 illustrates two overhead views of an alternative base design which comprises two L-shaped panels 36. The vertical members 37 are adjacent in the monolith position. The second illustration shows the apparatus open to protect a furniture corner 38 from the scratching of a cat. The illustration shows the vertical members 39 of the alternative foldable structure wrapped with a continuous piece of textile 40. Continuous textile construction, covering the vertical members, is a possible method to finish any of the various versions of the present invention.

Figure 9:
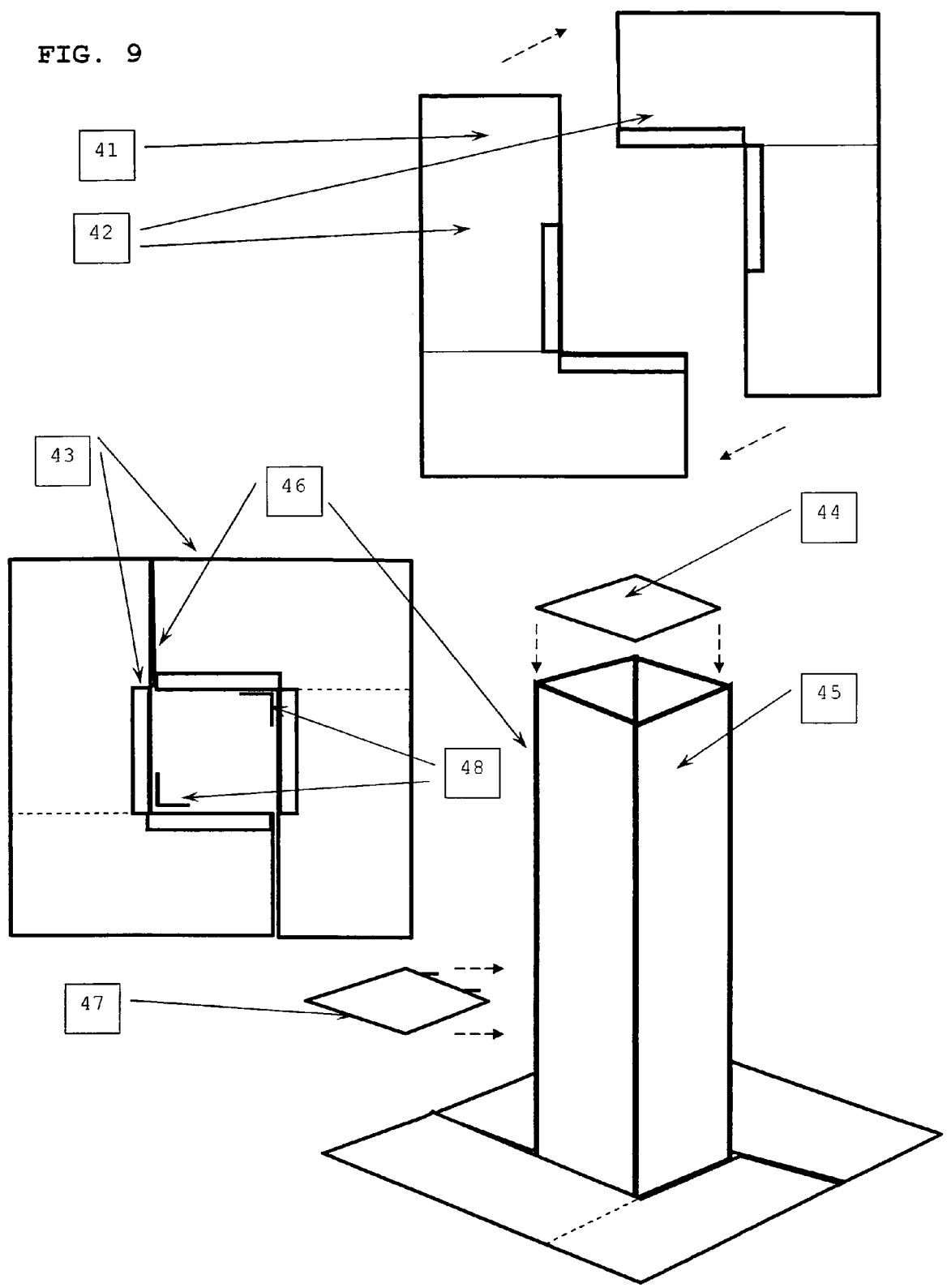
FIG. 9 shows an alternative base design which allows for two of the structures to be joined.

FIG. 9 shows views of an alternative base design, which offers a variation on the present invention. The base design comprises an angular base panel configuration 41, for two separate structures 42, which allows for the two structures 43 to be joined together. Further, a panel 44 can be placed on top to close the center four-panel column 45. The panel can be doweled to fit corresponding holes in the columns or, if attached at the top of the columns, it can be a sleeve structure with a larger perimeter dimension than the outer dimension of the columns such that a snug fit is made between the cap and the columns. The two separate structures should be attached along their common vertical edge 46. Other panels can be added to create a feature 47 for added interest for the cat. In this configuration the vertical members can be hinged 48 or rigid.

Figure 10:
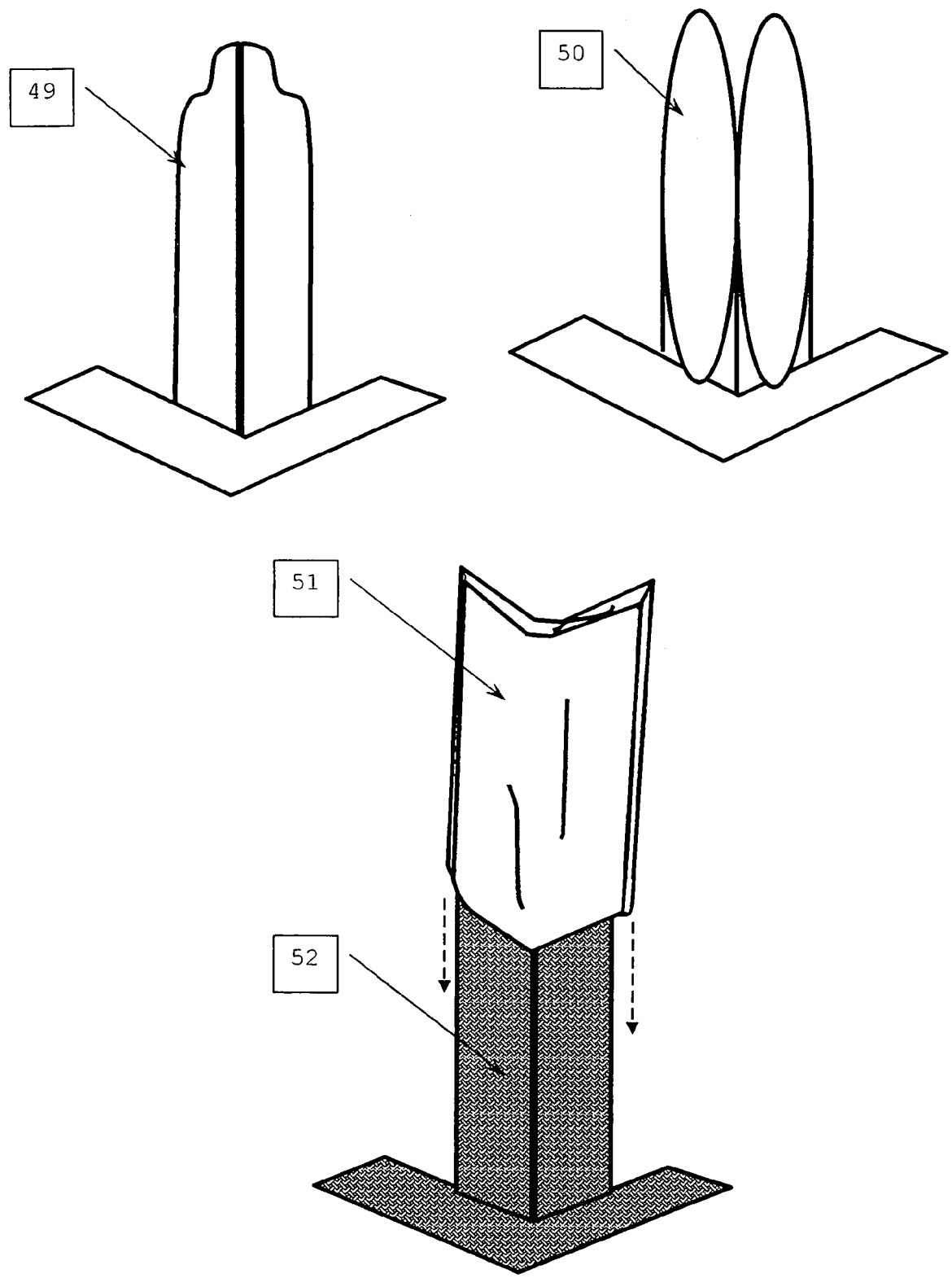
FIG. 10 shows the invention with various profiles and slip-cover exteriors.

FIG. 10 shows various shapes for the vertical members of the present invention. Profiles of many shapes such as angled 49 or rounded 50 can comprise the vertical members form. A slip cover 51 can be employed to cover the textile finished surface 52 of the present invention.

What is claimed is:

1. A free standing structure for directly blocking a protruding corner of furniture from the scratching of a cat, consisting of:
    (a) two adjoining vertical panels, each having a common vertical meeting edge where said two vertical panels abut, said vertical panels attached along the common, vertical, meeting edge; and
    (b) a base comprising two base panels each of which is a horizontal member, and each of which is attached to one of said vertical panels, said base panels extending outward from the vertical panels to form a L-shaped base when said vertical panels are perpendicular to each other and forming a protruding corner;
    (c) said two base panels are so arranged that the said attached vertical panels can be folded together to form a monolith configuration with the said two horizontal base panels serving as its free standing base; and
    (d) each of said vertical and base panels has a surface, and one or more of said surfaces is covered with a textile material for the scratching of a cat or other clawed animal.

2. The structure of claim 1 wherein the vertical panels are attached to each other with hinges.

3. The structure of claim 1 wherein the vertical panels are attached to each other by a durable, pliable material serving as a hinge between the panels.

4. The structure of claim 1 wherein the vertical panels are attached to each other with suitable hardware.

5. The structure of claim 1 wherein said structure can be assembled from components by the end user.

6. The structure of claim 1, where the vertical panels each having a cap piece to extend the height of said structure.

7. The structure of claim 1, wherein, one or both the base panels having an extension piece attached.

8. The structure of claim 1 wherein said textile material having bobbles to increase the interest of the cat.

9. The structure of claim 1 wherein said textile material forming a slip-cover to cover the vertical panels of the structure.

* * * * *